April 5, 1932.         W. K. HOWE         1,852,575
REMOTE CONTROL MEANS
Filed Feb. 20, 1930
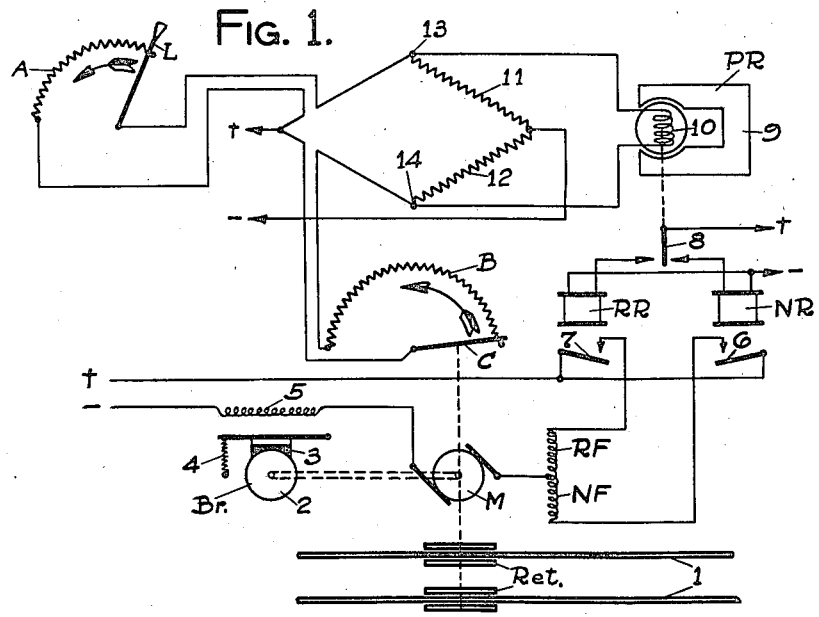
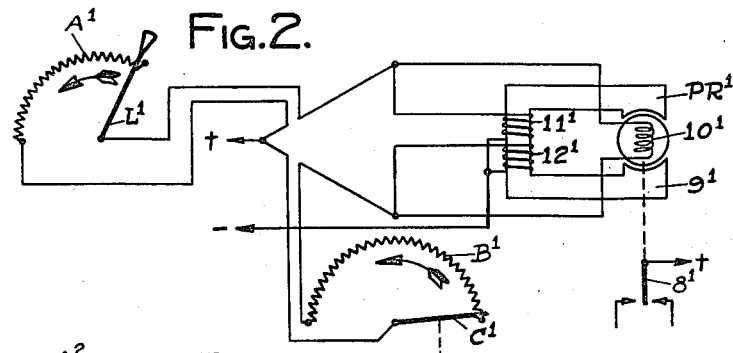
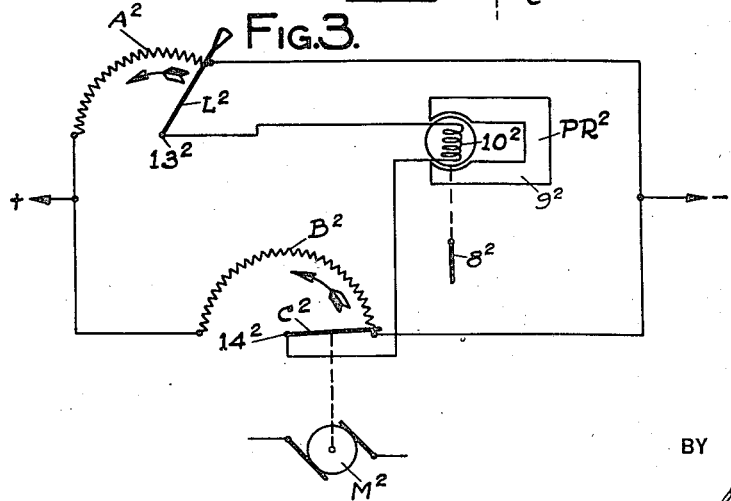
INVENTOR
W. K. Howe,
BY Neil W. Preston,
his ATTORNEY Patented Apr. 5, 1932

1,852,575

UNITED STATES PATENT OFFICE

WINTHROP K. HOWE, OF ROCHESTER, NEW YORK, ASSIGNOR TO GENERAL RAILWAY SIGNAL COMPANY, OF ROCHESTER, NEW YORK

REMOTE CONTROL MEANS

Application filed February 20, 1930. Serial No. 430,078.

This invention relates in general to car retarders, and has more particular reference to a remote control means for electric motor controlled car retarders of the track brake type.

As in the W. K. Howe Patent No. 1,757,428 dated May 6, 1930, it is desirable, where an outlying retarder has a motor control for varying the degrees of retardation according to requirements, to provide as flexible a remote control means for the motor as is possible, whereby to give as wide a choice as possible of degrees of retardation.

With the above and other considerations in mind, it is proposed, in accordance with this invention, to provide a remote control means whereby any number of different degrees of retardation can be obtained.

More specifically, in accordance with this invention, an outlying motor operable to vary the degree of retardation of its retarder, is controlled from a signal tower or the like by a lever in the tower which is manually movable over a resistance unit, to thereby upset the normal potential balance between this lever and a contact arm operated by the outlying motor, whereby to energize the motor. When the motor operates, it moves this contact arm over a resistance in a direction to restore the potential balance and bring the potential of the manually movable lever and the motor operated arm to an equality to thereby de-energize the motor.

The invention is also useful in many other connections, as for example, operating a master control lever or the like at an outlying location, by means of a lever in a signal tower.

Further objects, purposes and characteristic features of the present invention will appear as the description progresses, reference being made to the accompanying drawings showing, in a wholly diagrammatic manner, and in no manner whatsoever in a limiting sense, several forms which the invention can assume. In the drawings:—

Fig. 1 is a diagrammatic view of one form of the invention.

Fig. 2 is a diagrammatic view of a different form of the invention.

Fig. 3 is a diagrammatic view of a still different form of the invention.

Referring now to the drawings, and first to Fig. 1, there is here shown a stretch of track constituted by track rails 1, equipped with a car retarder Ret., the degree of retardation to be exerted thereby being determined by the position to which a control motor M has been operated, in the manner, for example, as disclosed in the Howe application above referred to. The motor M is equipped with an electro-magnetic brake Br, including a brake drum 2, a brake shoe 3 normally spring pressed into active position by a spring 4, and magnetically released upon the energization of a winding 5 which is connected in series with the motor armature, the motor M having a normal and a reverse field winding NF and RF respectively, for operating the motor in a normal and a reverse direction respectively, when energized.

Controlling the energizations of the motor M, are two relays NR and RR, having contact fingers 6 and 7 respectively which, when closed, respectively energize the motor M to operate in a normal and a reverse direction through circuits which are obvious from the drawings. The relays NR and RR are controlled by a polarized relay PR having a contact finger 8 which is normally biased to its shown neutral position, and is energized to move either to the right or to the left to respectively energize relays NR and RR through circuits which are obvious from the drawings. Relay PR, in the form shown in Fig. 1, has a permanent magnet field 9, and an armature winding 10.

Located at the motor M, is a resistance B over which a motor driven arm C can move, while located in the signal tower, generally at some distance from the retarder, is a resistance A over which a manually operable control lever L can move, the two resistances A and B being equal. Connected in series with the resistance A is a resistance 11, and connected in series with resistance B is a resistance 12 which is equal to 11, the two sets of series resistances, A and 11, and B and 12, being connected in multiple between the terminals of a source of energy represented by the usual + and —, thus constituting a resistance bridge.

Connected across the multiple resistance arms of the bridge, at the points 13 and 14, is the winding 10 of the polar relay PR, and since, with the levers L and C in the positions shown in Fig. 1 to make the resistances A and B in circuit of equal value, no difference of potential exists between the points 13 and 14 and hence the polar relay winding 10 is deenergized.

On disturbing the equality between the resistance A and B in circuit, as for example, by moving the lever L in the signal tower to the left, the portion of resistance A in circuit becomes less than B so that point 13 becomes negative with respect to point 14 and current flows through the winding 10 from 14 to 13 whereby to energize relay PR to move its contact finger 8 to the right. This picks up relay NR to close its contact finger 6 and energize the normal field winding NF of motor M and at the same time energize brake winding 5 to release the brake and initiate normal operation of motor M.

The motor continues to operate and move its contactor C in a counter-clockwise direction until the balance between the portions of the resistances A and B in circuit is restored, at which time points 13 and 14 again become of equal potential, to thereby deenergize the system.

Movement of the control lever L in the opposite direction, clockwise, causes reverse operation of the motor and corresponding clockwise movement of its contactor C in the same general manner as above described.

Thus with the arrangement just described, it is clear that any movement of lever L in the signal tower, in either direction, will cause a corresponding operation of the outlying motor M to correspondingly position the motor contactor C. In other words, the lever L and the contactor C accurately follow each other to thereby give a very flexible remote control of the motor M and permit an infinite number of different positions to which the motor can be operated.

Referring now to Fig. 2, the arrangement here shown is very similar to that of Fig. 1, the only difference being that the resistances 11 and 12 in the two multiple arms of the bridge of Fig. 1 are here shown as cumulative windings $11^1$ and $12^1$ on the field core $9^1$ of the polar relay $PR^1$, the core $9^1$ in this case being an electro-magnet.

When the levers $L^1$ and $C^1$ are in corresponding positions, so as to bring about a balanced condition of the resistances, the current flowing through the windings $11^1$ and $12^1$ are equal, and the core $9^1$ is magnetized. Thus under balanced conditions the core $9^1$ is energized and the winding $10^1$ of the polar relay is de-energized, while upon movement of the lever $L^1$ to disturb the balance, the armature, as well as the field of the polar relay, is energized.

Referring to Fig. 3, the arrangement here shown is very similar to that of Fig. 1, except that the resistances 11 and 12 of Fig. 1 are omitted, the resistances $A^2$ and $B^2$ being equal and, as shown in the drawings, constitutes multiple branches connected between opposite terminals of a source of energy. With the levers $L^2$ and $C^2$ in corresponding positions, no potential difference exists between the ends of these levers, between which is connected the armature winding $10^2$ of the polar relay. As soon, however, as the balance of resistances is destroyed by movement of the lever $L^2$ as, for example, to the right, the point $13^2$ becomes positive with respect to the point $14^2$, whereby to cause energization of the armature winding $10^2$ of polar relay $PR^2$, the field of which is constituted by a permanent magnet. The operation otherwise is much the same as described above.

In the showing in Figs. 2 and 3, it has been deemed unnecessary to duplicate certain of the parts shown in Fig. 1, such as the brake, the normal and reverse relays NR and RR, the retarder Ret., etc., but it should be understood that these parts constitute portions of the systems exemplified in Figs. 2 and 3.

The above rather specific description of various forms of this invention, are given solely by way of example, and are not intended, in any manner whatsoever, in a limiting sense. Obviously, the invention can assume various different physical forms, and is susceptible of numerous modifications, and all such forms and modifications, are intended to be covered by this application, as come within the scope of the appended claims.

Having described my invention, I now claim:—

1. In a distant control system for electric motors, in combination, a distant positioned motor, two resistances connected in multiple across a source of energy, a biased polar relay for controlling energy to the motor, and having a field member of said relay energized by portions of said resistances, the relay being connected across said resistances, whereby to cause current to flow through the relay when the points of connection to said resistances are at different potentials, a manually operable control lever for disturbing the balance of said points, and a contactor operable by the motor in a direction to restore the balance.

2. In a car retarder control system, in combination with a car retarder and a control motor therefor, control means for the motor including, two resistances connected in multiple across a source of energy, a manually operable lever movable over one resistance, a contactor driven by the motor and movable over the other resistance, a biased polar relay having an energizing winding connected between said lever and contactor to thus become energized when the lever and contactor are at different potentials, an electro-magnetic field member for the polar relay wherein the field energizing coils are portions of said two resistances, cumulatively arranged, an energizing circuit for the motor controlled by said polar relay to cause the motor to drive the contactor to a point where its potential is the same as that of said lever, to thus de-energize the polar relay and de-energize the motor.

In testimony whereof I affix my signature.

WINTHROP K. HOWE.